United States Patent
Liao et al.

[19]

[11] Patent Number: 6,109,573
[45] Date of Patent: Aug. 29, 2000

[54] TRIPOD STRUCTURE

[76] Inventors: Yuan-Chi Liao; Yuan-Cheng Liao, both of No. 2, Lane 304, Ching-Cheng Road, Taichung, Taiwan

[21] Appl. No.: 09/223,799

[22] Filed: Dec. 31, 1998

[51] Int. Cl.[7] .................................................. F16M 11/38
[52] U.S. Cl. .............................. 248/170; 403/92; 403/170
[58] Field of Search ................................ 248/170, 163.1, 248/177.1, 183.1, 183.4, 183.5, 183.2; 403/92, 157, 91, 101, 97, 79, 110, 87, 170, 217, 169, 52, 66, 68, 71, 94, 105, 158, 161, 205, 328

[56] References Cited

U.S. PATENT DOCUMENTS

| | | | |
|---|---|---|---|
| 256,540 | 4/1882 | Browne | 248/177.1 X |
| 2,591,051 | 4/1952 | Caldwell | 248/177.1 X |
| 4,034,946 | 7/1977 | Zimmer, Jr. | 248/183.2 |
| 4,247,069 | 1/1981 | Kurz | 248/183.2 |
| 4,886,230 | 12/1989 | Jones et al. | 248/170 |
| 4,905,946 | 3/1990 | Wang | 248/170 |
| 5,082,222 | 1/1992 | Hsu | 248/170 |
| 5,154,382 | 10/1992 | Hoshino | 248/185 |
| 5,265,969 | 11/1993 | Chuang | 403/94 |
| 5,340,068 | 8/1994 | Sarkisian et al. | 248/188.6 |
| 5,425,520 | 6/1995 | Masumoto | 248/247 |
| 5,620,272 | 4/1997 | Sheng | 403/96 |
| 5,661,942 | 9/1997 | Palmer | 403/96 X |
| 5,735,499 | 4/1998 | Phillips et al. | 248/230.1 |
| 5,836,561 | 11/1998 | Liao | 248/291.1 |

*Primary Examiner*—Anita M. King
*Attorney, Agent, or Firm*—Rosenberg, Klein & Lee

[57] ABSTRACT

A tripod structure including a plastic-made connecting seat. A bottom end of the connecting seat is formed with three cavities each of which is defined by two lateral securing plates. An angular metal plate is fixed on the outer faces of the two interconnected securing plates. The metal plate is bent to form a left plate and a right plate which are integrally connected with each other and respectively tightly attach to the securing plates. The left and right plates serve to reinforce each other to achieve a good bending strength. Therefore, the securing plates of the connecting seat is able to bear greater lateral force and bending force without deformation. Accordingly, the tripod structure can be stably used without tilting.

1 Claim, 6 Drawing Sheets

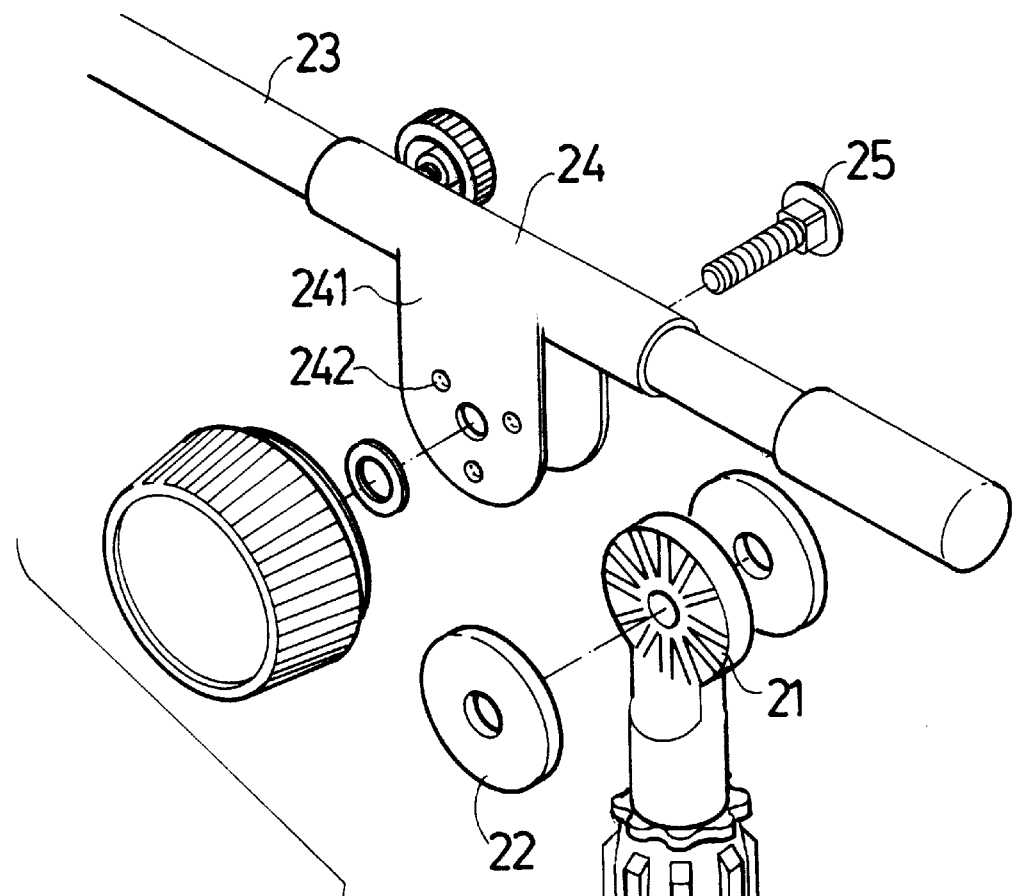
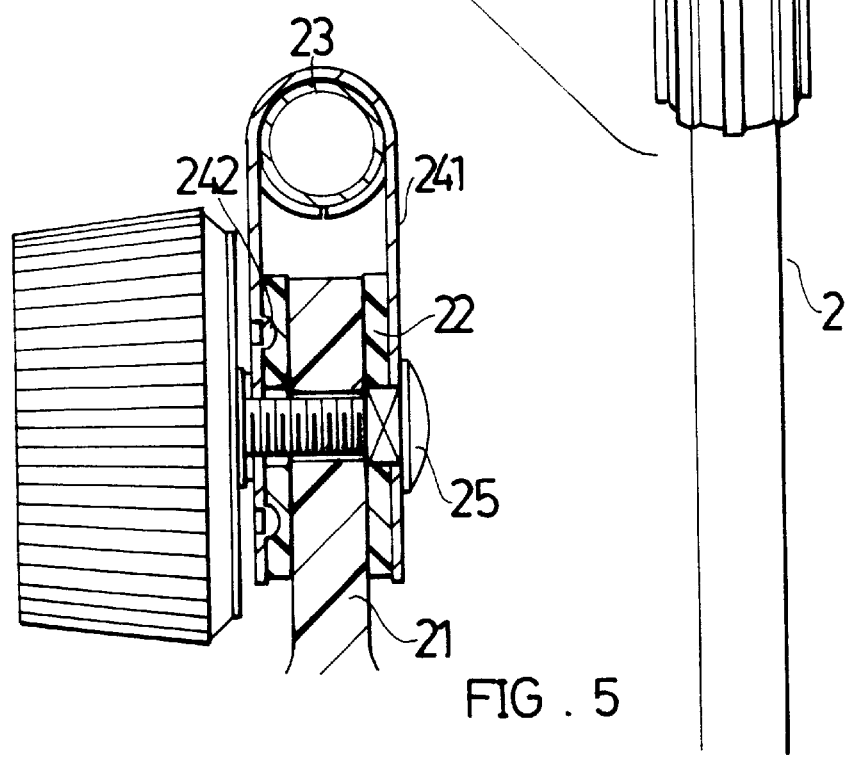
FIG. 4
FIG. 5

TRIPOD STRUCTURE

BACKGROUND OF THE INVENTION

The present invention relates to a tripod structure which can be more stably used and is manufactured at low cost.

FIG. 6 shows a connecting seat 81 of an existing tripod 8. The connecting seat 81 is made of aluminum or zinc material. A bottom end of the connecting seat 81 is formed with three cavities 82 which are defined by three pairs of opposite securing plates 84. In each cavity 82 is pivotally disposed a support leg 83. The securing plate 84 of the aluminum or zinc-made connecting seat 81 has no flexibility so that the securing plate 84 cannot bear relatively great torque. Therefore, the outer ends of each two adjoined securing plates 84 are interconnected by a reinforcing plate 85. This makes it more troublesome to manufacture the connecting seat 81 and will increase the manufacturing cost. A middle pivot position of the securing plate 84 is spaced from the reinforcing plate 85 by a certain distance so that it is difficult to rivet the securing plate 84 and it is necessary to pass a screw 86 through the reinforcing plate 85 to be tightened by a nut 87 on outer side of another securing plate 84 for locking. Therefore, the assembling procedure is quite troublesome.

FIG. 7 shows a plastic-made connecting seat 91 of the existing tripod 9. A bottom end of the connecting seat 91 is formed with three cavities 92 which are defined by three pairs of downward extending opposite securing plates 94. In each cavity 92 is pivotally stretchably disposed a support leg 93. The securing plate 94 is pivotally connected with the support leg 93 by a rivet 95 and has a certain flexibility. However, such securing plate 94 is not sufficiently rigid so that in the case that the tripod 9 is subject to a deflecting pressure, only the side wall of the securing plate 94 and the rivet 95 will suffer a bending force. Therefore, the securing plates 94 will be unevenly stressed and the cavities 92 will be expanded. Under such circumstance, the tripod 9 is apt to tilt or even fall down.

SUMMARY OF THE INVENTION

It is therefore a primary object of the present invention to provide a tripod structure in which the connecting seat is made by plastic injection molding. A bent metal plate is fixed on outer side of the interconnected securing plates. A left and a right plates of the metal plate are integrally connected with each other and serve to reinforce each other to achieve a very good bending strength. Therefore, the securing plates of the connecting seat are able to bear greater lateral pressure without deformation and thus the tripod can be more stably used.

It is a further object of the present invention to provide the above tripod structure which is manufactured at low cost.

It is still a further object of the present invention to provide the above tripod structure in which the cantilever has a clamping section for firmly securing the cantilever on a main pillar of the tripod structure.

The present invention can be best understood through the following description and accompanying drawings, wherein:

BRIEF DESCRIPTION OF THE DRAWINGS

FIG. 4 is a perspective exploded view of the pivot section of the present invention;

FIG. 5 is a sectional assembled view of the pivot section of the present invention;

DETAILED DESCRIPTION OF THE PREFERRED EMBODIMENT

Figure 1:
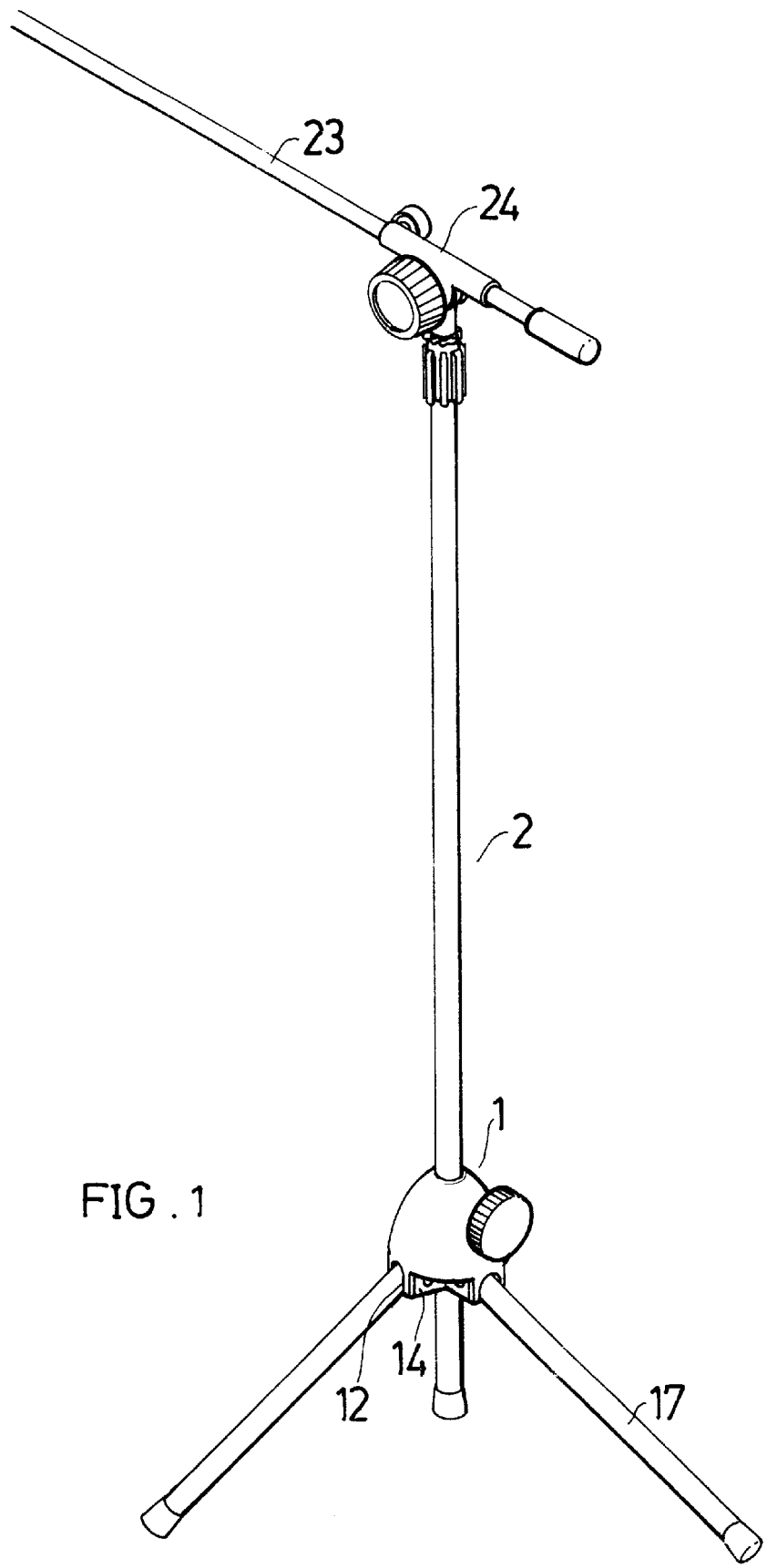
FIG. 1 is a perspective assembled view of the present invention.
Figure 2:
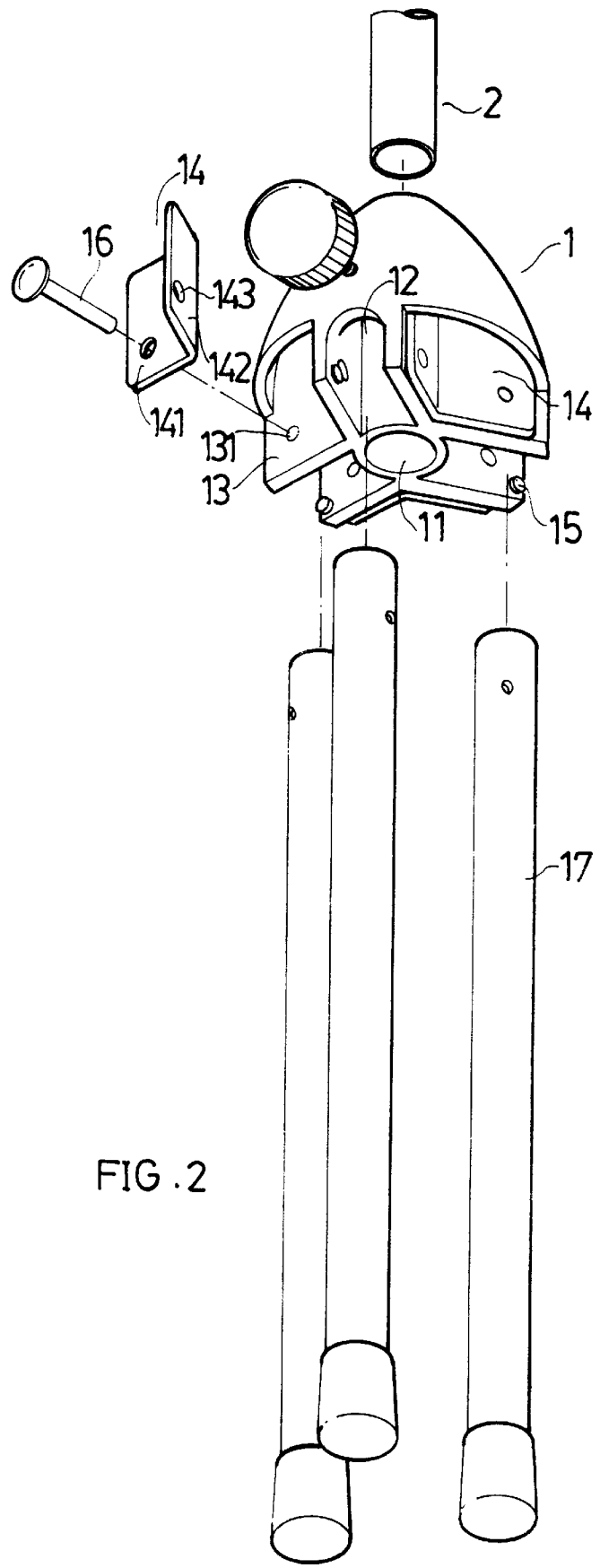
FIG. 2 is a perspective exploded view of the connecting seat of the present invention.

Please refer to FIGS. 1 to 5. The present invention includes a plastic-made connecting seat 1. A central section of the connecting seat 1 is formed with a fitting hole axially extending through the top and bottom of the connecting seat 1. A main pillar 2 is disposed in the fitting hole 11. A bottom end of the connecting seat 1 is formed with three cavities 12 radially extending from the central fitting hole 11. Each cavity 12 is defined by two lateral securing plates 13. A middle portion of the securing plate 13 is formed with a rivet hole 131. A boss 15 is disposed on an outer end of bottom edge of inner face of the securing plate 13. Two adjacent securing plates 13 of two adjacent cavities 12 are integrally interconnected with each other at outer side of the fitting hole 11. An angular steel plate 14 is fixed on the outer faces of the two interconnected securing plates 13. The steel plate 14 is bent to form a left plate 141 and a right plate 142 containing an angle equal to the angle of the adjacent securing plate 13. The left and right plates 141, 142 respectively attach to the securing plate 13. A middle portion of each of the left and right plates 141, 142 is formed with a through hole 143. A rivet 16 is passed through the through hole 143 and the rivet hole 131 on one side of the cavity 12 to the rivet hole 131 on the other side of the cavity 12 and another through hole 143. The rivet 16 is also passed through a support leg pivotally disposed in the cavity 12.

A top end of the main pillar 2 is disposed with a pivot section 21. Each side of the pivot section 21 is formed with multiple teeth. Two sides of the pivot section 21 respectively tightly abut against two pad blocks 22 clamped by a clamping section 24 of a cantilever 23. The clamping section 24 is formed by two clamping plates 241 one of which has three inward extending protuberances 242. A bolt 25 is axially passed through the center of the clamping section 24 for tightening the clamping section 24.

It should be noted that the steel plate 14 has a predetermined thickness and the left and right plates 141, 142 are integrally connected with each other. In the case that the left plate 141 is subject to a bending force, the force will be first transmitted to the right plate 142 which serves as a support beam for preventing the left plate 141 from being bent.

Figure 3:
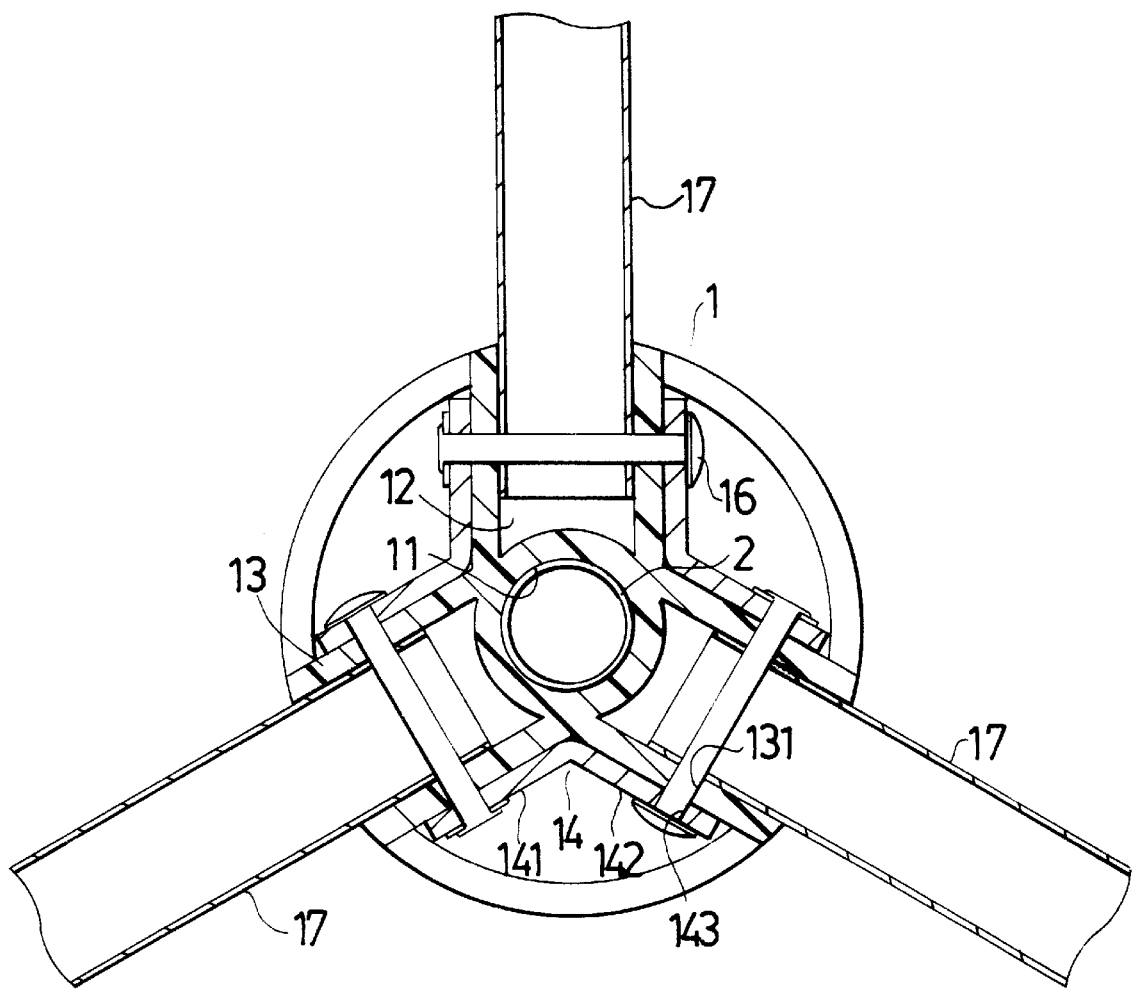
FIG. 3 is a sectional assembled view of the connecting seat of the present invention.
Figure 6:
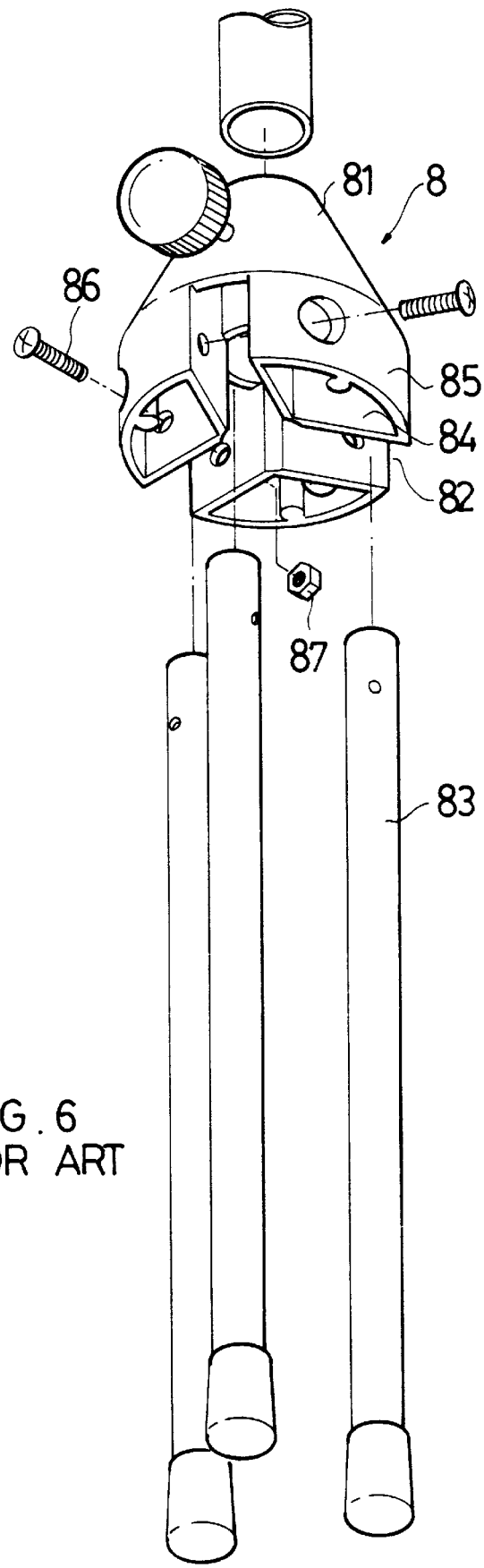
FIG. 6 is a perspective exploded view of the connecting seat of a conventional tripod.
Figure 7:
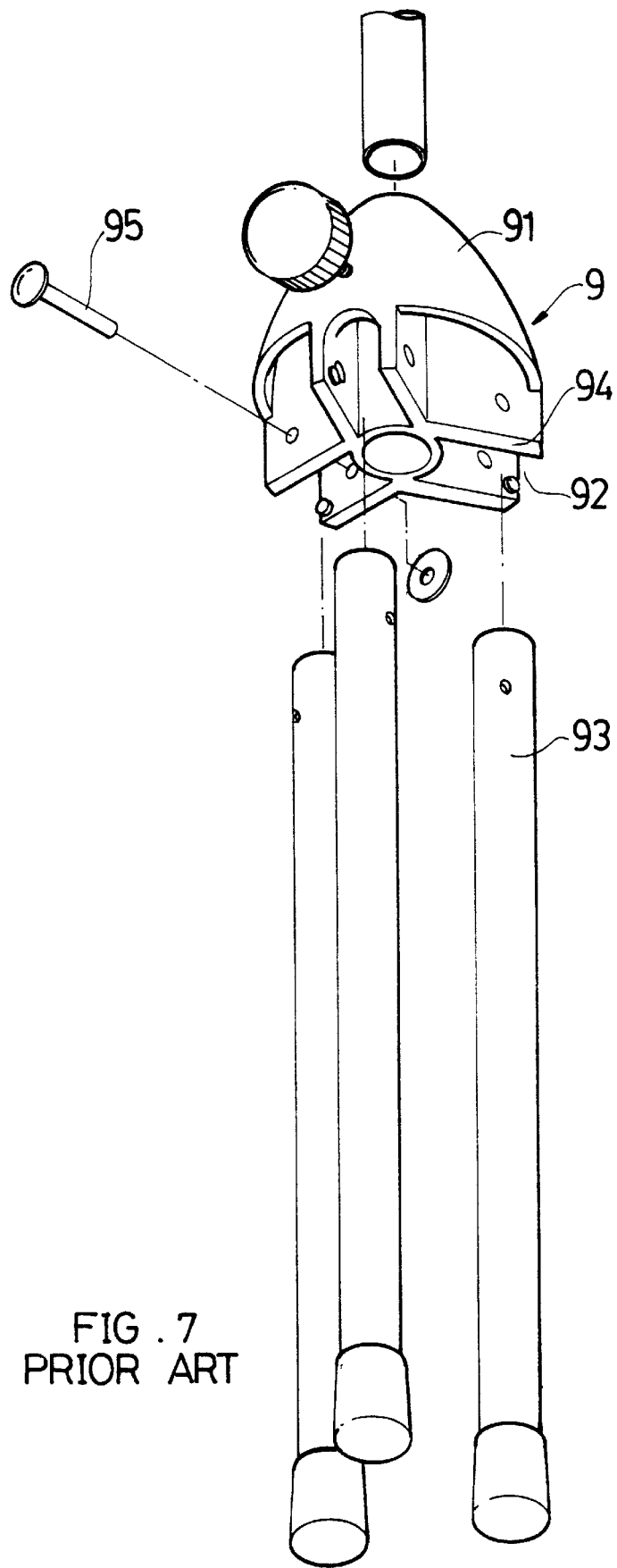
FIG. 7 is a perspective exploded view of the connecting seat of another type of conventional tripod.

Please refer to FIG. 3. When assembling the present invention, the support leg 17 is first inserted into the cavity 12. Then the steel plate 14 is placed on outer side of two integrally connected securing plates 13 and tightly attached to the securing plates 13. Then the rivet 16 is passed through the rivet holes 131 and through holes 143 to rivet the support leg 17 with the securing plates 13. Then the main pillar 2 is inserted into the fitting hole 11. The pad blocks 22 are attached to two sides of the pivot section 21 of the top end of the main pillar 2. Then the clamping section 24 is fitted onto outer sides of the pad members 22 and locked by the bolt 25 to complete the assembling procedure of the present invention. Accordingly, the present invention can be quickly and easily assembled. In addition, in use of the present invention, a user only needs to stretch the three support legs 17 to a fixed position where the protuberances 15 are engaged with the support legs 17. Then the bolt 25 is slightly loosened to adjust the angle of the cantilever 23 Then the bolt 25 is tightened. Still very wide space remains on outer side of the steel plate 14 and the components between the opposite steel plates 14 tightly contact with each other so that the riveting of the rivet can be conveniently performed.

The connecting seat 1 is made by plastic injection molding so that the manufacturing cost is greatly reduced. Moreover, the steel plate 14 is bent after cut so that the manufacturing procedure can be accomplished very quickly. The steel plate 14 has very small area and a certain thickness. Also, the left and right plates 141, 142 of the steel plate 14 serve to reinforce each other. Therefore, in use, the cavity 12 is able to bear greater lateral force and bending force without deformation. Accordingly, the present invention can be stably used without tilting.

In addition, the clamping section 24 is compressed by the tightening bolt 25, whereby the three protuberances 242 on inner face of one clamping plate 241 press the pad block 22 and slightly deform the pad block 22 and form depressions at the protuberances 242. The other face of the pad block 22 is correspondingly deformed to form projections which are engaged with the teeth 211. Therefore, the cantilever 23 can be more firmly fixed without deflection due to the weight of an article secured thereon.

It is to be understood that the above description and drawings are only used for illustrating one embodiment of the present invention, not intended to limit the scope thereof. Any variation and derivation from the above description and drawings should be included in the scope of the present invention.

What is claimed is:

1. A tripod structure comprising a connecting seat formed of plastic, a central section of the connecting seat being formed with a fitting hole axially extending through a top and a bottom of the connecting seat, a main pillar being disposed in the fitting hole, a top end of the main pillar being disposed with a pivot section, each side of the pivot section being formed with multiple teeth, two sides of the pivot section respectively tightly abutting against two pad blocks clamped by a clamping section of a cantilever, the clamping section being formed by two clamping plates one of which has three inward extending protuberances, a bolt being axially passed through a central portion of the clamping section for tightening the clamping section, a bottom end of the connecting seat being formed with three cavities radially extending from the fitting hole, each cavity being defined by two lateral securing plates, a middle portion of each securing plate being formed with a rivet hole, each securing plate having a boss disposed on an outer end of an inner face of the securing plate adjacent a bottom edge thereof, two adjacent securing plates of two adjacent cavities being integrally interconnected with each other at an outer side of the fitting hole, an angular metal plate being fixed on outer faces of the two interconnected securing plates, the metal plate being bent to form a left plate and a right plate, the left and right plates respectively tightly attaching to the securing plates, a middle portion of each of the left and right plates being formed with a through hole, three rivets being passed through respective through holes of the metal plates and the rivet holes of the securing plates, each rivet also passing through a respective one of three support legs respectively disposed in the three cavities.

* * * * *